United States Patent
Abdullah

(10) Patent No.: US 11,454,530 B1
(45) Date of Patent: Sep. 27, 2022

(54) DEVICE FOR MEASURING AND QUANTIFYING AN EMULSION AND ITS CONTENTS MASS

(71) Applicant: Muhammed Abdullah, Sivaganga (IN)

(72) Inventor: Muhammed Abdullah, Sivaganga (IN)

( * ) Notice: Subject to any disclaimer, the term of this patent is extended or adjusted under 35 U.S.C. 154(b) by 0 days.

(21) Appl. No.: 17/321,432

(22) Filed: May 15, 2021

(51) Int. Cl.
| | |
|---|---|
| *E21B 21/08* | (2006.01) |
| *E21B 47/06* | (2012.01) |
| *B01D 17/04* | (2006.01) |
| *B01D 17/02* | (2006.01) |
| *G01F 23/263* | (2022.01) |
| *G01F 23/292* | (2006.01) |
| *G01F 25/20* | (2022.01) |
| *C10G 33/00* | (2006.01) |

(52) U.S. Cl.
CPC ............ *G01F 23/266* (2013.01); *E21B 21/08* (2013.01); *E21B 47/06* (2013.01); *G01F 23/292* (2013.01); *G01F 25/20* (2022.01); *B01D 17/02* (2013.01); *B01D 17/04* (2013.01); *C10G 33/00* (2013.01)

(58) Field of Classification Search
CPC ........ C10G 33/00; B01D 17/02; B01D 17/04; B01D 17/00; E21B 21/08; E21B 47/06; E21B 49/08
See application file for complete search history.

(56) References Cited

U.S. PATENT DOCUMENTS

| | | | |
|---|---|---|---|
| 2006/0150726 A1* | 7/2006 | Jacobson | ................ E21B 49/10 73/152.27 |
| 2013/0000400 A1* | 1/2013 | Welle | ................. G01N 33/2847 73/290 V |

FOREIGN PATENT DOCUMENTS

UA    95626 C2 *  8/2011

* cited by examiner

*Primary Examiner* — John Fitzgerald
*Assistant Examiner* — Truong D Phan

(57) ABSTRACT

A device (102, 300) for measuring and quantifying an emulsion and its contents mass when immersed in a fluid comprising two immiscible liquids is provided. The device (102, 300) includes at least one pressure sensor (302A-I) configured to measure hydrostatic pressure measurement data and a device processor (104) configured to, (i) convert the hydrostatic pressure measurement data into respective mass measurement data using a mass calculation formula, (ii) detect a condition of the fluid as emulsion, if the hydrostatic pressure measurement data is lesser than the hydrostatic pressure measurement data of a first liquid and greater than the hydrostatic pressure measurement data of a second liquid in the fluid, (iii) calculate the first and second liquid mass in the emulsion condition of the first and second liquid, and (iv) calculate a total mass of the first liquid and the second liquid in the chamber (310).

28 Claims, 5 Drawing Sheets

```
┌─────────────────────────────────────────────────────────────┐
│  OBTAINING AT LEAST ONE PRESSURE MEASUREMENT DATA BY AT     │
│ LEAST ONE PRESSURE SENSOR DIRECTLY IN CONTACT WITH THE FLUID│
│  COMPRISING THREE DIFFERENT LAYERS 'X', 'Y' & 'Z' CONTAINED │
│                        IN A CHAMBER                         │
│                             502                             │
└─────────────────────────────────────────────────────────────┘
                              │
                              ▼
┌─────────────────────────────────────────────────────────────┐
│ CONVERTING THE HYDROSTATIC PRESSURE MEASUREMENT DATA INTO   │
│ RESPECTIVE MASS MEASUREMENT DATA USING A MASS CALCULATION   │
│                          FORMULA                            │
│                             504                             │
└─────────────────────────────────────────────────────────────┘
                              │
                              ▼
┌─────────────────────────────────────────────────────────────┐
│   DETECTING A CONDITION OF THE FLUID AS EMULSION, IF THE    │
│  HYDROSTATIC PRESSURE MEASUREMENT DATA IS LESSER THAN THE   │
│  HYDROSTATIC PRESSURE MEASUREMENT DATA OF A FIRST LIQUID IN │
│   THE FLUID AND GREATER THAN THE HYDROSTATIC PRESSURE       │
│   MEASUREMENT DATA OF A SECOND LIQUID IN THE FLUID          │
│                             506                             │
└─────────────────────────────────────────────────────────────┘
                              │
                              ▼
┌─────────────────────────────────────────────────────────────┐
│ CALCULATING THE FIRST LIQUID MASS AND THE SECOND LIQUID MASS│
│  IN THE EMULSION CONDITION OF THE FIRST LIQUID AND THE      │
│                       SECOND LIQUID                         │
│                             508                             │
└─────────────────────────────────────────────────────────────┘
                              │
                              ▼
┌─────────────────────────────────────────────────────────────┐
│ CALCULATING A TOTAL MASS OF THE FIRST LIQUID & TOTAL MASS OF│
│           THE SECOND LIQUID IN THE CHAMBER                  │
│                             510                             │
└─────────────────────────────────────────────────────────────┘
                                                    ↙ 500
```

FIG. 5

DEVICE FOR MEASURING AND QUANTIFYING AN EMULSION AND ITS CONTENTS MASS

BACKGROUND

Technical Field

The embodiments herein generally relate to a device for measuring emulsion, and more specifically, to a device for measuring and quantifying emulsion and its content mass in a fluid.

Description of the Related Art

Emulsion is a two-phase solution comprising a first phase constantly dispersed as globules in a second phase. Emulsions almost occur in most of the phases of oil processing causing various operational problems in gas/oil separation facilities. Untreated emulsions has both technical and commercial implications in the industry, especially in terms of treatment facilities, refining and transportation. Further, stable emulsions may lead to high pressure drops in flow lines, escalation in corrosion rate, tripping of separation equipments in Gas Oil Separation Plants (GOSP's), lowering of the oil API gravity. Hence, emulsions need to be treated appropriately to ensure an optimum production of hydrocarbons.

Major attention is being directed towards demulsifcation of emulsions. Various physical, chemical and biological demulsification processes has been proposed for the separation of emulsions. Demulsifiers are chemical additives or surfactants that are generally used to reduce and regulate emulsion in oil storage facilities, such as crude oil storage tanks. The amount of demulsifiers required for demulsifcation depends on the amount of emulsion. Overdosing of the demulsifiers can result in enhanced stability of the emulsion, leading to rag layers or pads inside the separators. This is a severe problem because it worsens with increased demulsifier costs. Further, the demulsifier overdosing at a treatment facility is difficult to determine. Various automated or semi-automated demulsifier control systems have been proposed to determine optimum demulsifier rates. These system includes sensors such as temperature sensors, pressure transducers to determine emulsion layers, quality of liquids forming the emulsions, operating temperature etc. These sensors measure a physical property of a fluid by performing adaptive measurements through bidirectional signals. The drawbacks associated with the use of temperature sensors is that they show non-linearity and least stability in measurements. Further, they are capable of providing only inferential measurement like density compensated for temperature variation. Multi-phase level instruments are used for determining different level phases in the fluid on density profile basis using radioactive sources. Emulsion measurement based on density profile has drawbacks as the density changes due to change in temperature and pressure which should be compensated. Further, emulsion measurement in percentage prevents optimization of demulsifier chemical dosing by mass ratio basis.

Inexistence of a direct method with less uncertainties for quantifying emulsions and its contents mass in oil and gas upstream facilities affects the inventory control and the quality of evaluation to a greater extent in gas/oil separation facilities. Therefore, there arises a need to address the aforementioned technical drawbacks in existing technologies for an accurate measurement and quantification of emulsion and its contents mass.

SUMMARY

In view of the foregoing, an embodiment herein provides a device to measure and quantify mass contents of two liquids that are immiscible in an emulsion state when immersed in a fluid comprising two liquids that are immiscible. According to a first aspect, a device for measuring and quantifying an emulsion and its contents mass when immersed in a fluid comprising two liquids which are immiscible is provided. The device includes at least two pressure sensors configured to measure hydrostatic pressure measurement data when it is directly in contact with the fluid including three different layers 'X', 'Y' and 'Z' contained in a chamber. The device processor is communicatively connected to the at least two pressure sensors. The device processor is provided inside a processor housing that is placed outside the chamber. The device processor is configured to (i) convert the hydrostatic pressure measurement data into respective mass measurement data using a mass calculation formula; (ii) detect a condition of the fluid as emulsion, if the hydrostatic pressure measurement data is lesser than the hydrostatic pressure measurement data of a first liquid in the fluid and greater than the hydrostatic pressure measurement data of a second liquid in the fluid; (iii) calculate the first liquid mass and the second liquid mass in the emulsion condition of the first liquid and the second liquid; and (iv) calculate a total mass of the first liquid and total mass of the second liquid in the chamber.

In some embodiments, the mass calculation formula is defined as:

$$m = \left[\frac{(P)(V_1 - V_2 - V_3)}{gh}\right],$$

where m is the mass measurement data, P is the hydrostatic pressure measurement data, $V_1$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_2$ is a volume of the at least one item occupied inside the chamber calculated with reference to the height in-between the datum line of the at least two pressure sensors $P_{(n-1)}$ and $P_n$, $V_3$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to gravity, h is a height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, the hydrostatic pressure measurement data is hydrostatic pressure difference data $\Delta P_n$ obtained from the hydrostatic pressure measurement data of the at least two pressure sensors $P_{(n-1)}$ and $P_n$ given as: $P_{n-1} - P_n = \Delta P_n$.

In some embodiments, the mass of the first liquid in the emulsion condition is calculated using the formula:

$$(m_{kfl}) = \left[\frac{(E_{kfl})(V_{a1} - V_{a2} - V_{a3})}{gh_1}\right],$$

where $E_{kfl}$ is a pressure due to the first liquid in the emulsion, where k=1,2,3, ... n, $V_{a1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{a2}$ is a volume of the at least one item occupied inside the chamber calculated which is calculated with reference to the height in-between the datum line of the at least two pressure sensors, $V_{a3}$ is a volume occupied by the device comprising the at least two pressure sensors within the sensor housing inside the chamber which is calculated with reference to the height in-between the datum line of the at least two pressure sensors $P_{(n-1)}$ and $P_n$ for the device, g is an acceleration due to the gravity, $h_1$ is a height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, $E_{kfl}$ is determined using a formula: $P_{fl}*$'x'% of $E_{kfl}$, where $P_{fl}$ is pressure measurement data of the first liquid between the at least two pressure sensors $P_{(n-1)}$ and $P_n$.

In some embodiments, 'x'% of $E_{kfl}$ is determined using a formula:

$$\frac{\Delta P_k - P_{sl}}{1\% \text{ of } P_e},$$

where $\Delta P_k$ is a hydrostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$. $P_e$ value is based on the pressure measurement data of the first liquid and the second liquid.

In some embodiments, 1 % of $P_e$ is determined using a formula:

$$\frac{(P_{fl} - P_{sl})}{100} = \frac{P_e}{100},$$

where $P_{fl}$ is the pressure measurement data of the first liquid between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is the pressure measurement data of emulsion between the at least two pressure sensors $P_{(n-1)}$ and $P_n$.

In some embodiments, $V_{a1}=A_1 h_1$, where $A_1$ is an area of cross section of the chamber, $h_1$ is the height calculated between the at least two pressure sensors $P_{(n-1)}$ and $P_n$, $$V_{a2} = \left[\frac{m}{\rho}\right],$$

where m is a mass of the at least one item inside the chamber, ρ is mass density of the at least one item inside the chamber, $V_3=A_3 h_1$, where $A_3$ is an area of the device, $h_1$ is the height calculated between the at least two pressure sensors $P_{(n-1)}$ and $P_n$. $V_{a1}$, $V_{a2}$, $V_{a3}$ are calculated between the at least two pressure sensors $P_{(n-1)}$ and $P_n$.

In some embodiments, the mass of the second liquid in the emulsion condition is calculated using the formula:

$$(m_{kfsl}) = \left[\frac{(F_{ksl})(V_{b1} - V_{b2} - V_{b3})}{gh_1}\right],$$

where $F_{ksl}$ is pressure due to the second liquid in the emulsion, where k=1,2,3, ... n, $V_{b1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{b2}$ is a volume of the at least one item occupied inside the chamber calculated with reference to the height in-between the datum line of the at least two pressure sensors $P_{(n-1)}$ and $P_n$, $V_{b3}$ is a volume occupied by the device comprising the at least two pressure sensors within the sensor housing inside the chamber calculated with reference to the height in-between the datum line of the at least two pressure sensors $P_{(n-1)}$ and $P_n$, g is the acceleration due to the gravity, $h_1$ is the height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, $F_{ksl}$ is determined using the formula: of $P_{sl} \times$'y'% of $F_{ksl}$, where $P_{sl}$ is the pressure measurement data of the second liquid between the at least two pressure sensors $P_{(n-1)}$ and $P_n$.

In some embodiments, 'y'% of $F_{ksl}$ is determined using the formula:
    100%−'x'% of $E_{kfl}$.

In some embodiments, $V_{b1}=A_1 h_1$, where $A_1$ is the area of cross section of the chamber, $h_1$ is the height calculated between the at least two pressure sensors $P_{(n-1)}$ and $P_n$, $$V_{b2} = \left[\frac{m}{\rho}\right],$$

where m is the mass of the at least one item inside the chamber, ρ is the mass density of the at least one item inside the chamber, $V_{b3}=A_3 h_1$, where $A_3$ is the area of the device, $h_1$ is the height calculated between the at least two pressure sensors $P_{(n-1)}$ and $P_n$. $V_{b1}$, $V_{b2}$, $V_{b3}$ are calculated between the at least two pressure sensors $P_{(n-1)}$ and $P_n$.

In some embodiments, the pressure sensor $P_{(n-1)}$ is a first sensor and the pressure sensor $P_n$ is a second sensor which is positioned subsequent to the pressure sensor $P_{(n-1)}$.

In some embodiments, the mass of the emulsion ($m_{ke}$) in the condition of the fluid as emulsion is determined by the sum of mass of the first liquid in the emulsion ($m_{kfl}$) and the mass of the second liquid in the emulsion ($m_{ksl}$) given by ($m_{ke}=(m_{kfl})+(m_{ksl})$), where k=1,2,3, ... n.

In some embodiments, the total mass of the emulsion ($m_{TE}$) in the chamber is determined using the formula:

$$\sum_{k=1}^{n} m_{ke} = \left(\sum_{k=1}^{n} m_{kfl} + \sum_{k=1}^{n} m_{ksl}\right),$$

where $$\sum_{k=1}^{n} m_{ke}$$

is the total emulsion mass ($m_{TE}$), $$\sum_{k=1}^{n} m_{kfl}$$

is total first liquid mass in emulsion $$(m_{TFL}), \sum_{k=1}^{n} m_{ksl}$$

is total second liquid mass in emulsion ($m_{TSL}$), k=1,2, 3, ... n.

In some embodiments, the device processor is further configured to calculate a height of interface layers in the emulsion condition of the first liquid and the second liquid.

In some embodiments, the interface layers include a first liquid-emulsion interface layer from the bottom of the chamber and a second liquid-emulsion interface layer from the bottom of the chamber.

In some embodiments, a height of the first liquid-emulsion interface layer from the bottom of the chamber is determined by the formula: $h_{fle}=(h_{p(n-1)}+H)$, where $h_{fle}$ is a height of the first liquid-emulsion interface layer from the bottom of the chamber, $h_{p(n-1)}$ is a height from the bottom of the chamber corresponding to the pressure sensor $P_{(n-1)}$ obtained from a look up table corresponding to a chamber strapping table, H is the height of interface layer between two pressure sensors $P_{(n-1)}$ and $P_n$.

In some embodiments, the height 'H' of interface layer between the at least two pressure sensors $P_{(n-1)}$ and $P_n$ is determined by the formula: H='x'% of $E_{kfl}*$'$h_1$', where $E_{kfl}$ is pressure due to the first liquid in emulsion calculated between the at least two pressure sensors $P_{(n-1)}$ and $P_n$, $h_1$ is the height between the two pressure sensors $P_{(n-1)}$ and $P_n$.

In some embodiments, 'x'% of $E_{kfl}$ is determined by $$\frac{\Delta P_k - P_{sl}}{1\% \text{ of } Pe},$$

where $\Delta P_k$ is a hydrostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$.

In some embodiments, 'x'% of $E_{kfl}$ is a largest value selected among the calculated 'x'% of $E_{kfl}$ where k=1,2, 3, ... n, wherein x % of $E_{kfl}$ is less than 100% of $P_{fl}$ and greater than 100% of $P_{sl}$, wherein $P_{fl}$ is pressure measurement data of the first liquid between the at least two pressure sensors $P_{(n-1)}$ and $P_n$, and $P_{sl}$ is pressure measurement data of the second liquid between the at least two pressure sensors $P_{(n-1)}$ and $P_n$.

In some embodiments, a height of the second liquid-emulsion interface layer from the bottom of the chamber is determined using the formula: $h_{sle}=(h_{p(n-1)}+H)$, where $h_{sle}$ is a height of the second liquid-emulsion interface layer height from the bottom of the chamber, $h_{p(n-1)}$ is a height from the bottom of the chamber corresponding to the pressure sensor $P_{(n-1)}$ obtained from a look up table corresponding to a chamber strapping table, H is a height of interface layer between the at least two pressure sensors $P_{(n-1)}$ and $P_n$.

In some embodiments, the height 'H' of interface layer between the at least two pressure sensors $P_{(n-1)}$ and $P_n$ is determined using the formula: H='x'% of $E_{kfl}*$'$h_1$', where $E_{kfl}$ is the pressure due to the first liquid in the emulsion calculated between the at least two pressure sensors $P_{(n-1)}$ and $P_n$, $h_1$ is the height between the at least two pressure sensors $P_{(n-1)}$ and $P_n$.

$$\frac{\Delta P_k - P_{sl}}{1\% \text{ of } Pe},$$

In some embodiments, 'x'% of $E_{kfl}$ is calculated by where $\Delta P_k$ is a hydrostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$ and $P_e$ is pressure measurement data of emulsion between the at least two pressure sensors $P_{(n-1)}$ and $P_n$. $P_e$ value is based on the pressure measurement data of the first liquid and the second liquid.

In some embodiments, 'x'% of $E_{kfl}$ is a smallest value selected among the calculated 'x'% of $E_{kfl}$ where k=1,2, 3, ... n. x % of $E_{kfl}$ is less than 100% of $P_{fl}$ and greater than 100% of $P_{sl}$, wherein $P_{fl}$ is pressure measurement data of the first liquid between the at least two pressure sensors $P_{(n-1)}$ and $P_n$, wherein $P_{sl}$ is pressure measurement data of the second liquid between the at least two pressure sensors $P_{(n-1)}$ and $P_n$.

According to a second aspect, a method for measuring and quantifying mass contents of two liquids that are immiscible in an emulsion state is provided. The method includes the steps of (i) obtaining at least two pressure measurement data by at least two pressure sensors directly in contact with the fluid including three different layers 'X', 'Y' and 'Z' contained in a chamber, (ii) converting the hydrostatic pressure measurement data into respective mass measurement data using a mass calculation formula, (iii) detecting a condition of the fluid as emulsion, if the hydrostatic pressure measurement data is lesser than the hydrostatic pressure measurement data of a first liquid in the fluid and greater than the hydrostatic pressure measurement data of a second liquid in the fluid, (iv) calculating the first liquid mass and the second liquid mass in the emulsion condition of the first liquid and the second liquid, and (v) calculating a total mass of the first liquid and total mass of the second liquid in the chamber.

In some embodiments, the mass calculation formula is defined as:

$$m = \left[\frac{(P)(V_1 - V_2 - V_3)}{gh}\right],$$

where m is the mass measurement data, P is the hydrostatic pressure measurement data, $V_1$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_2$ is a volume of the at least one item occupied inside the chamber calculated with reference to the height in-between the datum line of the at least two pressure sensors $P_{(n-1)}$ and $P_n$, $V_3$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to gravity, h is a height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, the hydrostatic pressure measurement data is hydrostatic pressure difference data $\Delta P_n$, obtained from the hydrostatic pressure measurement data of the at least two pressure sensors $P_{(n-1)}$ and $P_n$ given as: $P_{n-1} - P_n = \Delta P_n$.

The device is used to measure and quantify emulsion and its contents mass which is useful in regulatory control of demulsifier chemical dosing. The emulsion content mass measurement is useful in regulatory control of emulsion in the chamber by adopting a methodology of mass ratio demulsifier chemical dosage. The device is most suitable for Tank Inventory calculation. The device measures the emulsion mass based on a hydrostatic pressure profile basis. Since mass is an intrinsic property which is not affected by pressure and temperature, there is no need of temperature compensation. The device helps to reduce the demulsifier chemical inventory significantly thereby reducing the operating cost.

These and other aspects of the embodiments herein will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE DRAWINGS

The embodiments herein will be better understood from the following detailed description with reference to the drawings, in which:

FIG. 5 is a flow diagram that illustrates a method for measuring and quantifying an emulsion and its contents mass when immersed in a fluid comprising two liquids that are immiscible according to some embodiments herein.

DETAILED DESCRIPTION OF THE DRAWINGS

Figure 1:
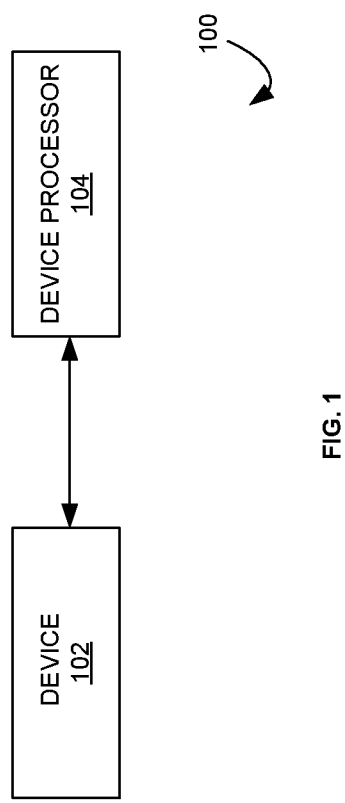
FIG. 1 is a block diagram of a device for measuring and quantifying an emulsion and its contents mass when immersed in a fluid comprising two liquids that are immiscible according to some embodiments herein.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

As mentioned, there remains a need for a device to measure and quantify emulsion and its contents accurately. The embodiments herein achieve this by proposing a device for measuring and quantifying an emulsion and its contents mass based on hydrostatic pressure measurements. Referring now to the drawings, and more particularly to FIGS. 1 through 5, where similar reference characters denote corresponding features consistently throughout the figures, there are shown preferred embodiments.

FIG. 1 is a block diagram of a device for measuring and quantifying an emulsion and its contents mass when immersed in a fluid comprising two liquids that are immiscible according to some embodiments herein. The block diagram 100 includes the device 102 comprising a device processor 104. The device 102 includes at least two pressure sensors that are configured to measure hydrostatic pressure measurement data when it is directly in contact with the fluid including three different layers 'X', 'Y' and 'Z' contained in a chamber. The chamber may include a constant cross sectional area. The device processor 104 is communicatively connected to the at least two pressure sensors. The device processor 104 is configured to convert the hydrostatic pressure measurement data into respective mass measurement data using a mass calculation formula. The device processor 104 detects a condition of the fluid as emulsion, if the hydrostatic pressure measurement data is lesser than the hydrostatic pressure measurement data of a first liquid in the fluid and greater than the hydrostatic pressure measurement data of a second liquid in the fluid. The device processor 104 calculates the first liquid mass and the second liquid mass in the emulsion condition of the first liquid and the second liquid. The device processor 104 calculates a total mass of the first liquid and total mass of the second liquid in the chamber. The device processor 104 includes a memory to store the hydrostatic pressure measurement data, the first liquid mass and the second liquid mass in the emulsion condition and the total mass of the first liquid and total mass of the second liquid in the chamber. The device processor 104 includes Analog-to-Digital converters (ADC) that is configured to translate pressure signals obtained by the at least two pressure sensors into a digital representation of that signal. The digital representation can then be processed by the device processor 104. The device processor 104 includes a power supply card configured to convert and distribute power supply. The power supply card may be installed in a slot provide in the device 104. The power supply card includes a main body of the card, a power supply and a power transferring unit. The calculated parameters may be transmitted digitally as an industrial standard signal for control systems.

Figure 2:
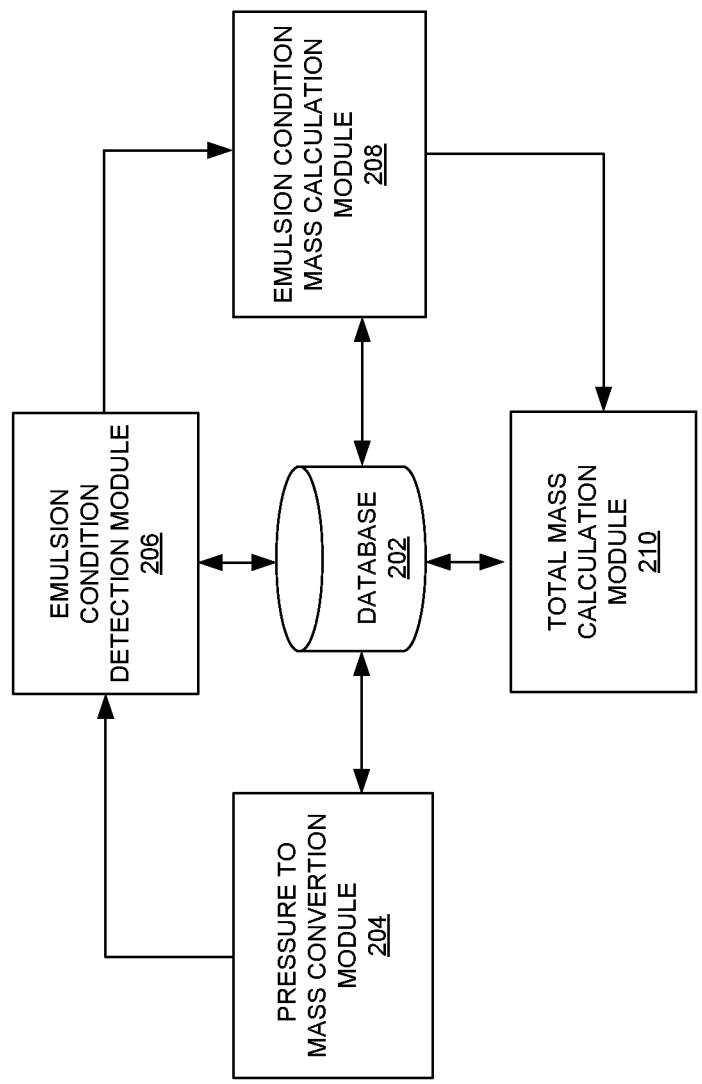
FIG. 2 is a block diagram of the device processor of the device of FIG. 1 according to some embodiments herein.

FIG. 2 is a block diagram of the device processor 104 of FIG. 1 according to some embodiments herein. The device processor 104 includes a memory comprising a database 202, a pressure to mass conversion module 204, an emulsion condition detection module 206, an emulsion condition mass calculation module 208 and a total mass calculation module 210. The pressure to mass conversion module 204 converts hydrostatic pressure measurement data obtained by the at least two pressure sensors into respective mass measurement data using a mass calculation formula. The emulsion condition detection module 206 detects a condition of the fluid as emulsion, if the hydrostatic pressure measurement data is lesser than the hydrostatic pressure measurement data of a first liquid in the fluid and greater than the hydrostatic pressure measurement data of a second liquid in the fluid. The emulsion condition mass calculation module 208 calculates the first liquid mass and the second liquid mass in the emulsion condition of the first liquid and the second liquid. The total mass calculation module 210 calculates a total mass of the first liquid and total mass of the second liquid in the chamber.

Figure 3:
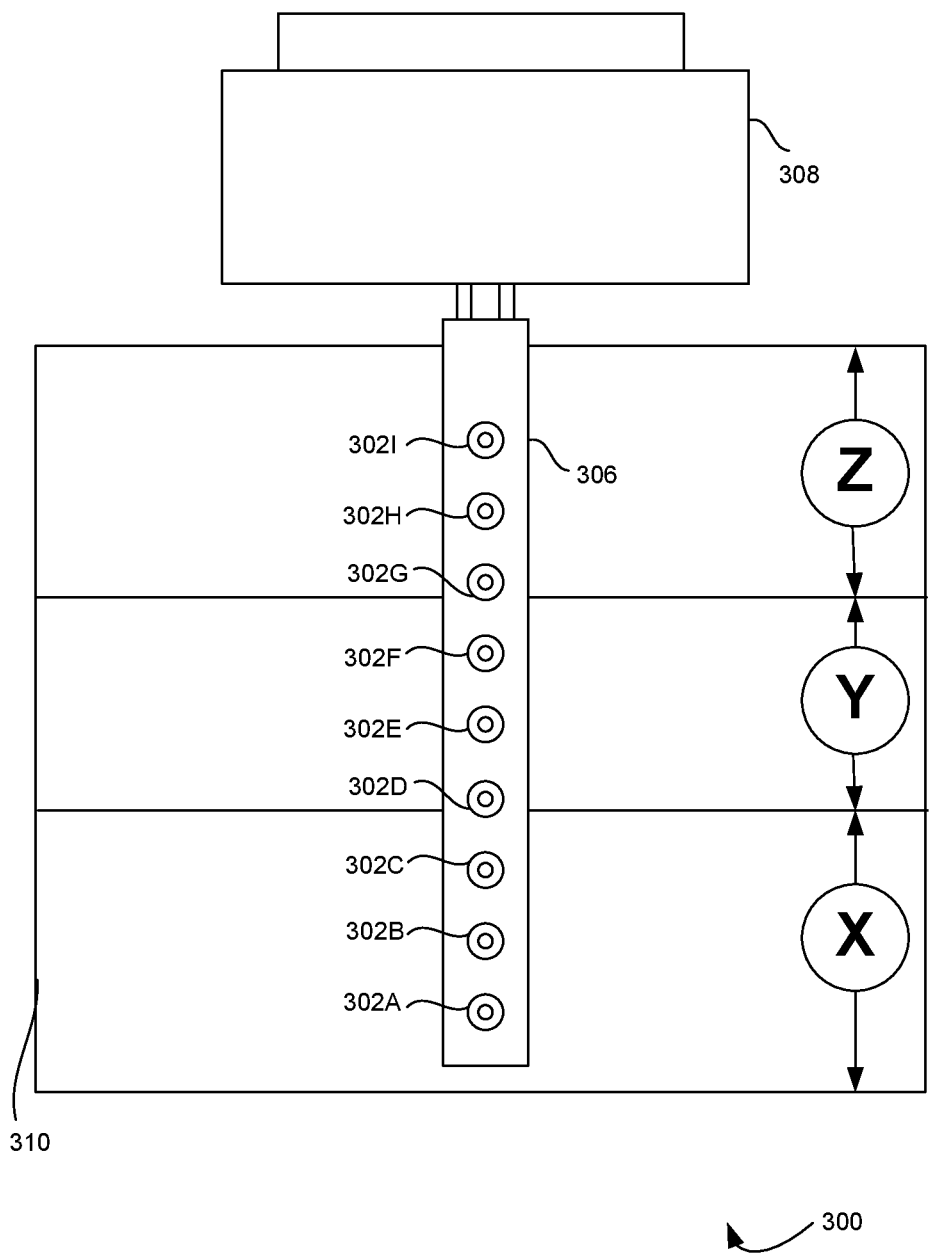
FIG. 3 illustrates a device for measuring and quantifying an emulsion and its contents mass when immersed in a fluid comprising two liquids that are imiscible according to some embodiments herein.

FIG. 3 illustrates a device for measuring and quantifying an emulsion and its contents mass when immersed in a fluid comprising two liquids that are immiscible according to some embodiments herein. The device 300 includes at least two pressure sensors 302A-I and a device processor. The device processor is provided inside a processor housing 308. The at least two pressure sensors 302A-I are configured to measure hydrostatic pressure measurement data when it is directly in contact with the fluid including three different layers 'X', 'Y' and 'Z' contained in a chamber 310. The processor housing 308 is placed outside the chamber 310 and the device processor is communicatively connected to the at least two pressure sensors 302A-I. The device processor is configured to convert the hydrostatic pressure measurement data into respective mass measurement data using a mass calculation formula. The device processor detects a condition of the fluid as emulsion, if the hydrostatic pressure measurement data is lesser than the hydrostatic pressure measurement data of a first liquid in the fluid and greater than the hydrostatic pressure measurement data of a second liquid in the fluid. The device processor calculates the first liquid mass and the second liquid mass in the emulsion condition of the first liquid and the second liquid. The device processor calculates a total mass of the first liquid and total mass of the second liquid in the chamber 310. The device 300 is configured to measure emulsion and its content mass in all types of storage chambers which includes but not limited to wet crude tank, dual tank, desalter vessels, three phase separator, slop tank, containers etc with different chamber geometry. The different chamber geometry may include vertical cylinder, horizontal cylinder, sphere, vertical bullet and horizontal bullet. The at least two pressure sensors 302A-I are calibrated using hydrostatic pressure reference data. If same pressure difference between pressure sensors of at least three numbers at layer 'X' which is in equal distance apart may be considered for validation of any single-phase of non-miscible heavier liquid (i.e.) first liquid. Similarly, if the same pressure difference between pressure sensors of at least three numbers at layer 'Z' which is in equal distance apart may be considered for validation of any single-phase of non-miscible lighter liquid (i.e.) second liquid. In some embodiments, the device 300 is further configured to measure the first liquid mass and the second mass in the emulsion condition accurately in the chamber 310 in which the inside volume is occupied by any of the following items such as spreader header, collector header, electrical grids, any mechanical support items etc.

Figure 4E:
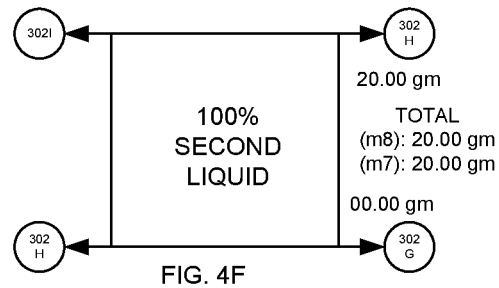
FIGS. 4A-4F illustrate emulsion mass calculation of a fluid comprising a first liquid and a second liquid using the device of FIG. 3 according to some embodiments herein.
Figure 4F:
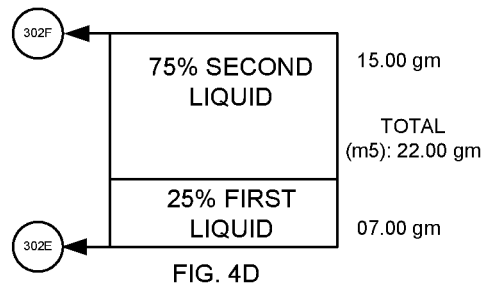
Figure 4C:
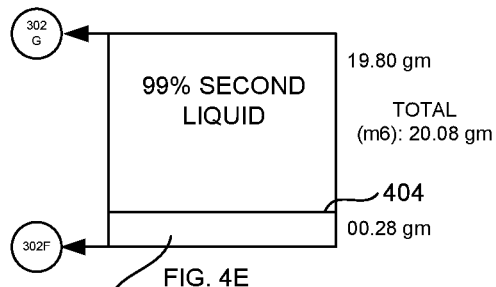
Figure 4D:
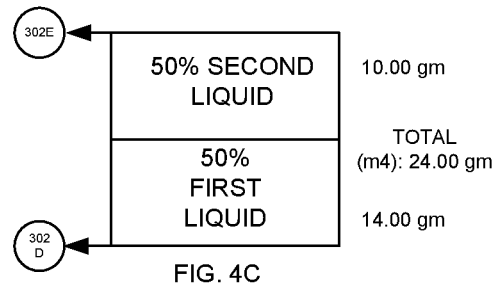
Figure 4A:
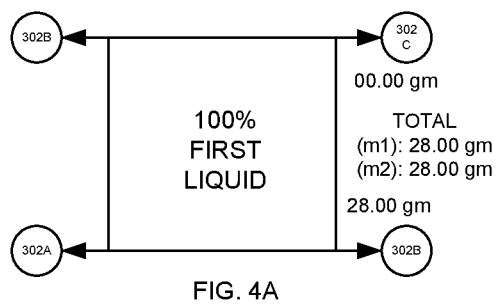
Figure 4B:
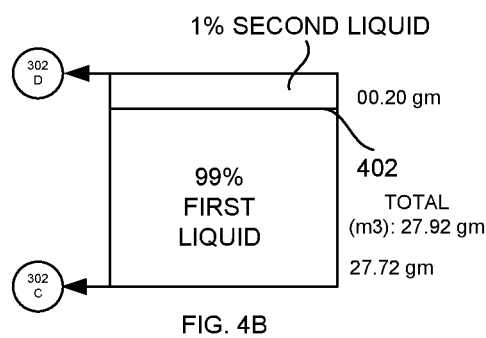

FIGS. 4A-4F illustrate emulsion mass calculation of a fluid comprising a first liquid and a second liquid using the device of FIG. 3 according to some embodiments herein. The device 300 includes at least two pressure sensors 302A-I that are configured to measure hydrostatic pressure measurement data when it is directly in contact with the fluid including three different layers 'X', 'Y' and 'Z' contained in the chamber. For example, the mass of the first liquid m1 is 28 grams (gm) (1% of 28 gram is 0.28 gm), the mass of the second liquid m8 is 20 gm (1% of 20 gram is 0.20 gm), and the mass of the emulsion m (m1–m8) is 8 gm. FIG. 4A shows 100% first liquid. The total mass m1 and m2 calculated is 28 gm. FIG. 4B shows the emulsion condition comprising 99% first liquid and 1% second liquid forming the first liquid-emulsion interface layer 402 from the bottom of the chamber 310. The total mass m3 calculated is 27.92 gm with 99% first liquid comprising 27.72 gm and 1% second liquid comprising 00.20 gm. FIG. 4C shows the emulsion condition comprising 50% first liquid and 50% second liquid. The total mass m4 calculated is 24.00 gm with 50% first liquid comprising 14.00 gm and 50% second liquid comprising 10.00 gm. FIG. 4D shows the emulsion condition comprising 25% first liquid and 75% second liquid. The total mass m5 calculated is 22.00 gm with 25% first liquid comprising 07.00 gm and 75% second liquid comprising 15.00 gm. FIG. 4E shows the emulsion condition comprising 1% first liquid and 99% second liquid forming the second liquid-emulsion interface layer 404 from the bottom of the chamber 310. The total mass m6 calculated is 20.08 gm with 1% first liquid comprising 00.28 gm and 99% second liquid comprising 19.80 gm. FIG. 4F shows 100% second liquid. The total mass m7 and m8 calculated is 20.00 gm.

FIG. 5 is a flow diagram that illustrates a method for measuring and quantifying an emulsion and its contents mass when immersed in a fluid comprising two liquids that are immiscible according to some embodiments herein. At a step 502, the method 500 includes obtaining at least two pressure measurement data by at least two pressure sensors directly in contact with the fluid including three different layers 'X', 'Y' and 'Z' contained in a chamber. At a step 504, the method 500 includes converting the hydrostatic pressure measurement data into respective mass measurement data using a mass calculation formula. At a step 506, the method 500 includes detecting a condition of the fluid as emulsion, if the hydrostatic pressure measurement data is lesser than the hydrostatic pressure measurement data of a first liquid in the fluid and greater than the hydrostatic pressure measurement data of a second liquid in the fluid. At a step 508, the method 500 includes calculating the first liquid mass and the second liquid mass in the emulsion condition of the first liquid and the second liquid. At a step 510, the method 500 includes calculating a total mass of the first liquid and total mass of the second liquid in the chamber. Optionally, the condition of the fluid as emulsion is detected, if the hydrostatic pressure measurement data is lesser than the hydrostatic pressure measurement data of 100% first liquid in the fluid and greater than the hydrostatic pressure measurement data of 100% second liquid in the fluid. Optionally, the first liquid is water and the second liquid is crude oil and the emulsion is a crude oil-water emulsion.

In some embodiments, the mass calculation formula is defined as:

$$m = \left[\frac{(P)(V_1 - V_2 - V_3)}{gh}\right],$$

where m is the mass measurement data, P is the hydrostatic pressure measurement data, $V_1$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_2$ is a volume of the at least one item occupied inside the chamber calculated with reference to the height in-between the datum line of the at least two pressure sensors $P_{(n-1)}$ and $P_n$, $V_3$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to gravity, h is a height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, the hydrostatic pressure measurement data is hydrostatic pressure difference data $\Delta P_n$ obtained from the hydrostatic pressure measurement data of the at least two pressure sensors $P_{(n-1)}$ and $P_n$ given as: $P_{n-1} - P_n = \Delta P_n$. Each of the at least two pressure sensors $P_1$, $P_2$, $P_3$, $P_4$, $P_5$ ... $P_n$ reads hydrostatic pressure measurement data in Pascal $$\left[\frac{N}{m^2}\right].$$

The numbering convention starts from bottom sensor of the chamber.

The Pressure difference is calculated as follows, $$P_1 - P_2 = \Delta P_1$$
$$P_2 - P_3 = \Delta P_2$$
$$P_3 - P_4 = \Delta P_3$$
$$\vdots \quad \vdots \quad \vdots$$
$$P_{n-1} - P_n = \Delta P_n$$

The device processor checks if $\Delta P_1 = \Delta P_2$, and stores the value of $\Delta P_1 = \Delta P_{fl}$ in the memory as hydrostatic pressure measurement data of 100% first liquid in Pascal. The device processor checks if $\Delta P_{(n-1)} = \Delta P_n$, then stores the value of $\Delta P_n = \Delta P_{sl}$, in the memory as hydrostatic pressure measurement data of 100% second liquid in Pascal. The pressure sensors of value $\Delta P_1$ and $\Delta P_2$ are immersed in the 'X' layer of the fluid and pressure sensors of value $\Delta P_{(n-1)}$ and $\Delta P^{(n)}$ are immersed in the 'Z' layer of the fluid.

In some embodiments, the mass of the first liquid in the emulsion condition is calculated using the formula:

$$(m_{kfl}) = \left[\frac{(E_{kfl})(V_{a1} - V_{a2} - V_{a3})}{gh_1}\right],$$

where $E_{kfl}$ is a pressure due to the first liquid in the emulsion, where k=1,2,3, ... n, $V_{a1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{a2}$ is a volume of the at least one item occupied inside the chamber calculated with reference to the height in-between the datum line of the at least two pressure sensors $P_{(n-1)}$ and $P_n$, $V_{a3}$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to the gravity, $h_1$ is a height calculated between the at least two pressure sensors $P_{(n-1)}$ and $P_n$. The at least one item inside the chamber may include a distributor header, collection header, internal dip pipe, electrical grids, vortex breaker, internal pipe work supports etc.

In some embodiments, $E_{kfl}$ is determined using a formula: $P_{fl} *$ 'x'% of $E_{kfl}$, where $P_{fl}$ is pressure measurement data of the first liquid between the at least two pressure sensors $P_{(n-1)}$ and $P_n$. The pressure due to the first liquid in the emulsion ($E_{kfl}$) should be lesser than the pressure due to the first liquid ($P_{fl}$) and greater than the pressure due to the second liquid ($P_{sl}$) between the at least two pressure sensors $P_{(n-1)}$ and $P_n$. Optionally, $P_{fl}$ is a pressure measurement data of 100% first liquid between the at least two pressure sensors $P_{(n-1)}$ and $P_n$.

In some embodiments, 'x'% of $E_{kfl}$ is determined using a formula:

$$\frac{\Delta P_k - P_{sl}}{1\% \text{ of } P_e},$$

where $\Delta P_k$ is a hydrostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$. $P_e$ value is based on the pressure measurement data of the first liquid and the second liquid. The measuring span of emulsion in the chamber is given by $P_{fl} - P_{sl} = P_e$.

In some embodiments, 1% of $P_e$ is determined using a formula:

$$\frac{(P_{fl} - P_{sl})}{100} = \frac{P_e}{100},$$

where $P_{fl}$ is the pressure measurement data of the first liquid between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is the pressure measurement data of emulsion between the at least two pressure sensors $P_{(n-1)}$ and $P_n$.

In some embodiments, $V_{a1} = A_1 h_1$ where $A_1$ is an area of cross section of the chamber, $A_1$ is considered only for the chamber of constant cross section area between the at least two pressure sensors $P_{(n-1)}$ and $P_n$, $h_1$ is the height calculated between the at least two pressure sensors $P_{(n-1)}$ and $P_n$, $$V_{a2} = \left[\frac{m}{\rho}\right],$$

wherein where m is a mass of the at least one item inside the chamber, ρ is mass density of the at least one item inside the chamber, wherein $V_{a3}=A_3h_1$, where $A_3$ is an area of the device, $h_1$ is the height calculated between the at least two pressure sensors $P_{(n-1)}$ and $P_n$. $V_{a1}$, $V_{a2}$, $V_{a3}$ are calculated between the at least two pressure sensors $P_{(n-1)}$ and $P_n$. In some embodiments, $V_{a1}$ is obtained from the chamber strapping table, in this case $V_{a2}$ is 0.

In some embodiments, the mass of the second liquid in the emulsion condition is calculated using the formula:

$$(m_{ksl}) = \left[\frac{(F_{ksl})(V_{b1} - V_{b2} - V_{b3})}{gh_1}\right],$$

where $F_{ksl}$ is pressure due to the second liquid in the emulsion, where k=1,2,3, . . . n, $V_{b1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{b2}$ is a volume of the at least one item occupied inside the chamber calculated with reference to the height in-between the datum line of the at least two pressure sensors $P_{(n-1)}$ and $P_n$, $V_{b3}$ is a volume occupied by the device comprising the at least two pressure sensors within the sensor housing inside the chamber calculated with reference to the height in-between the datum line of the at least two pressure sensors $P_{(n-1)}$ and $P_n$, g is the acceleration due to the gravity, $h_1$ is the height calculated between the at least two pressure sensors $P_{(n-1)}$ and $P_n$. The at least one item comprises a distributor header, a collection header, an internal dip pipe, electrical grids, a vortex breaker, or internal pipe work supports.

In some embodiments, $F_{ksl}$ is determined using the formula: $P_{sl} \times$ 'y'% of $F_{ksl}$, where $P_{sl}$ is the pressure measurement data of the second liquid between the at least two pressure sensors $P_{(n-1)}$ and $P_n$. The pressure due to the second liquid in the emulsion ($E_{ksl}$) should be lesser than the pressure due to the first liquid ($P_{fl}$) and greater than the pressure due to the second liquid ($P_{sl}$) between the at least two pressure sensors $P_{(n-1)}$ and $P_n$. Optionally, $P_{sl}$ is a pressure measurement data of 100% second liquid between the at least two pressure sensors $P_{(n-1)}$ and $P_n$.

In some embodiments, 'y'% of $F_{ksl}$ is determined using the formula:

100%−'x'% of $E_{kfl}$.

In some embodiments, $V^{b1}=A_1h_1$, where $A_1$ is the area of cross section of the chamber, $A_1$ is considered only for the chamber of constant cross section area between the at least two pressure sensors $P_{(n-1)}$ and $P_n$, $h_1$ is the height calculated between the at least two pressure sensors $P_{(n-1)}$ and $P_n$, $$V_{b2} = \left[\frac{m}{\rho}\right],$$

where m is me mass or me at least one item inside the chamber, ρ is the mass density of the at least one item inside the chamber, $V_{b3}=A_3h_1$, where $A_3$ is the area of the device, $h_1$ is the height calculated between the at least two pressure sensors $P_{(n-1)}$ and $P_n$. $V_{b1}$, $V_{b2}$, $V_{b3}$ are calculated between the at least two pressure sensors $P_{(n-1)}$ and $P_n$. In some embodiments, $V_{b1}$ is obtained from the chamber strapping table, in this case $V_{b2}$ is 0.

In some embodiments, the pressure sensor $P_{(n-1)}$ is a first sensor and the pressure sensor $P_n$ is a second sensor which is positioned subsequent to the pressure sensor $P_{(n-1)}$. The pressure sensor $P_n$ may be the top most sensor and the pressure sensor $P_{(n-1)}$ is positioned below subsequently to the pressure sensor $P_n$.

In some embodiments, the mass of the emulsion ($m_{ke}$) in the condition of the fluid as emulsion is determined by the sum of the mass of the first liquid in the emulsion ($m_{kfl}$) and the mass of second liquid in the emulsion ($m_{ksl}$) given by ($m_{ke}$)=($m^{kfl}$)+($m_{ksl}$), where k=1,2,3, . . . n.

In some embodiments, the total mass of the emulsion ($m_{TE}$) in the chamber is determined using the formula:

$$\sum_{k=1}^{n} m_{ke} = \left(\sum_{k=1}^{n} m_{kfl} + \sum_{k=1}^{n} m_{ksl}\right),$$

where $$\sum_{k=1}^{n} m_{ke}$$

is the total emulsion mass $$(m_{TE}), \sum_{k=1}^{n} m_{kfl}$$

is total first liquid mass in emulsion $$(m_{TFL}), \sum_{k=1}^{n} m_{ksl}$$

is total second liquid mass in emulsion ($m_{TSL}$), k=1,2, 3, . . . n. The mass is calculated in Kilograms, which is represented by; $m_1, m_2, \ldots, m_n$.

In some embodiments, the method further comprises calculating interface layers in the emulsion condition of the first liquid and the second liquid.

In some embodiments, the interface layers include a first liquid-emulsion interface layer and a second liquid-emulsion interface layer from the bottom of the chamber. The first liquid-emulsion interface layer may starts from a condition of 99.999 . . . % of the first liquid and remaining % of the second liquid, where the pressure measurement data of the first liquid ($P_{fl}$) is greater than the pressure measurement data of the emulsion ($P_e$) between the at least two pressure sensors $P_{(n-1)}$ and $P_n$ (i.e.) $P_{fl} > P_e$. The second liquid-emulsion interface may start from a condition of 99.999 . . . % of the second liquid and remaining % of the first liquid, where the pressure measurement data of the emulsion ($P_e$) is greater than the pressure measurement data of the second liquid ($P_{sl}$) between the at least two pressure sensors $P_{(n-1)}$ and $P_n$ (i.e.) $P_e > P_{sl}$.

In some embodiments, a height of the first liquid-emulsion interface layer from the bottom of the chamber is determined by the formula: $h_{fle}=(h_{p(n-1)}+H)$, where $h_{fle}$ is a height of the first liquid-emulsion interface layer from the bottom of the chamber, $h_{p(n-1)}$ is a height from the bottom of the chamber corresponding to the pressure sensor $P_{(n-1)}$ obtained from a look up table corresponding to a chamber strapping table, H is the height of interface layer between the at least two pressure sensors $P_{(n-1)}$ and $P_n$.

In some embodiments, the height 'H' of interface layer between the at least two pressure sensors $P_{(n-1)}$ and $P_n$ is determined by the formula: H='x'% of $E_{kfl}$*'$h_1$', where $E_{kfl}$ is pressure due to the first liquid in emulsion calculated between the at least two pressure sensors $P_{(n-1)}$ and $P_n$, $h_1$ is the height between the at least two pressure sensors $P_{(n-1)}$ and $P_n$.

In some embodiments, 'x'% of $E_{kfl}$ is determined by $$\frac{\Delta P_k - P_{sl}}{1\% \text{ of } Pe},$$

where $\Delta P_k$ is a hydrostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$. $P_e$ value is based on the pressure measurement data of the first liquid and the second liquid. Optionally, $P_{sl}$ is pressure measurement data of 100% second liquid between the at least two pressure sensors $P_{(n-1)}$ and $P_n$.

In some embodiments, 'x'% of $E_{kfl}$ is a largest value selected among the calculated 'x'% of $E_{kfl}$ where k=1,2, 3, . . . n. x % of $E_{kfl}$ is less than 100% of $P_{fl}$ and greater than 100% of $P_{sl}$. $P_{fl}$ is pressure measurement data of the first liquid between the at least two pressure sensors $P_{(n-1)}$ and $P_n$, and $P_{sl}$ is pressure measurement data of the second liquid between the at least two pressure sensors $P_{(n-1)}$ and $P_n$.

With reference to the tank strapping table, the height from the bottom of the chamber corresponding to the at least two pressure sensors are calculated and stored in the lookup table. The height of each pressure sensor ($P_1$, $P_2$, $P_3$ . . . $P_n$) with reference to the chamber bottom is represented as $h_{p1}$, $h_{p2}$, $h_{p3}$, . . . $h_{pn}$ in mm. '$h_{pk}$', where, k=1,2,3, . . . n should be considered for material expansion due to temperature. The respective height $h_{p(n-1)}$ & $h_{p(n)}$ from the lookup table for the selected 'x'% of $E_{kfl}$ corresponding to the at least two pressure sensors $P_{(n-1)}$ and $P_n$ is obtained.

In some embodiments, a height of the second liquid-emulsion interface layer from the bottom of the chamber is determined using the formula: $h_{sle}=(h_{p(n-1)}+H)$, where $h_{sle}$ is a height of the second liquid-emulsion interface layer height from the bottom of the chamber, $h_{p(n-1)}$ is a height from the bottom of the chamber corresponding to the pressure sensors $P_{(n-1)}$ obtained from a look up table corresponding to a chamber strapping table, H is a height of interface layer between the at least two pressure sensors $P_{(n-1)}$ and $P_n$.

In some embodiments, the height 'H' of interface layer between the at least two pressure sensors $P_{(n-1)}$ and $P_n$ is determined using the formula: H='x'% of $E_{kfl}$*'$h_1$', where $E_{kfl}$ is the pressure due to the first liquid in the emulsion calculated between the at least two pressure sensors $P_{(n-1)}$ and $P_n$, $h_1$ is the height between the at least two pressure sensors $P_{(n-1)}$ and $P_n$. The minimal distance between the at least two pressure sensors $P_{(n-1)}$ and $P_n$ ensures more accurate interface height measurement. $h_1$ should be considered for material expansion due to temperature. In some embodiments, 'x'% of $E_{kfl}$ is calculated by $$\frac{\Delta P_k - P_{sl}}{1\% \text{ of } P_e},$$

where $\Delta P_k$ is a nyarostatic pressure difference due to the first liquid and the second liquid in emulsion condition between the at least two pressure sensors $P_{(n-1)}$ and $P_n$, $P_{sl}$ is pressure measurement data of the second liquid between the at least two pressure sensors $P_{(n-1)}$ and $P_n$ and $P_e$ is pressure measurement data of emulsion between the at least two pressure sensors $P_{(n-1)}$ and $P_n$. $P_e$ value is based on the pressure measurement data of the first liquid and the second liquid. Optionally, $P_{sl}$ is pressure measurement data of 100% second liquid between the at least two pressure sensors $P_{(n-1)}$ and $P_n$.

In some embodiments, 'x'% of $E_{kfl}$ is a smallest value selected among the calculated 'x'% of $E_{kfl}$ where k=1,2, 3, . . . n. x % of $E_{kfl}$ is less than 100% of $P_{fl}$ and greater than 100% of $P_{sl}$. $P_{fl}$ is pressure measurement data of the first liquid between the at least two pressure sensors $P_{(n-1)}$ and $P_n$, and $P_{sl}$ is pressure measurement data of the second liquid between the at least two pressure sensors $P_{(n-1)}$ and $P_n$.

With reference to the tank strapping table, the height from the bottom of the chamber corresponding to the at least two pressure sensors are calculated and stored in the lookup table. The height of each pressure sensor ($P_1$, $P_2$, $P_3$ . . . $P_n$) with reference to the chamber bottom is represented as $h_{p1}$, $h_{p2}$, $h_{p3}$, . . . $h_{pn}$ in mm. '$h_{pk}$', where, k=1,2,3, . . . n should be considered for material expansion due to temperature. The respective height $h_{p(n-1)}$ & $h_{p(n)}$ from the lookup table for the selected 'x'% of $E_{kfl}$ corresponding to the at least two pressure sensors $P_{(n-1)}$ and $P_n$ is obtained.

In some embodiments, the device processor is further configured to determine a density of at least one of the first liquid, the second liquid. The device processor calculates the density using a formula given by, Mass=Density*Volume.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the appended claims.

What is claimed is:

1. A device to measure and quantify mass contents of two liquids that are immiscible in an emulsion state, the device comprising:
    at least two pressure sensors, wherein the at least two pressure sensors are configured to measure hydrostatic pressure measurement data when it is directly in contact with the fluid comprising three different layers 'X', 'Y' and 'Z' contained in a chamber;

a device processor that is communicatively connected to the at least two pressure sensors, wherein the device processor is provided inside a processor housing that is placed outside the chamber, wherein the device processor is configured to:
- (i) convert the hydrostatic pressure measurement data into respective mass measurement data using a mass calculation formula;
- (ii) detect a condition of the fluid as emulsion, if the hydrostatic pressure measurement data is lesser than the hydrostatic pressure measurement data of a first liquid in the fluid and greater than the hydrostatic pressure measurement data of a second liquid in the fluid;
- (iii) calculate the first liquid mass and the second liquid mass in the emulsion condition of the first liquid and the second liquid; and
- (iv) calculate a total mass of the first liquid and total mass of the second liquid in the chamber.

2. The device as claimed in claim 1, wherein the mass of the emulsion ($m_{ke}$) in the condition of the fluid as emulsion is determined by the sum of the mass of the first liquid in the emulsion ($m_{kfl}$) and the mass of second liquid in the emulsion ($m_{ksl}$) given by $(m_{ke})=(m_{kfl})+(m_{ksl})$, where k=1,2, 3, ... n.

3. The device as claimed in claim 1, wherein the total mass of the emulsion ($m_{TE}$) in the chamber is determined using the formula:

$$\sum_{k=1}^{n} m_{ke} = \left(\sum_{k=1}^{n} m_{kfl} + \sum_{k=1}^{n} m_{ksl}\right),$$

where $$\sum_{k=1}^{n} m_{ke}$$

is the total emulsion mass ($m_{TE}$), $$\sum_{k=1}^{n} m_{kfl}$$

is total first liquid mass in emulsion ($m_{TFL}$), $$\sum_{k=1}^{n} m_{ksl}$$

is total second liquid mass in emulsion ($m_{TSL}$), k=1,2, 3, ... n.

4. The device as claimed in claim 1, wherein the mass calculation formula is defined as:

$$m = \left[\frac{(P)(V_1 - V_2 - V_3)}{gh}\right],$$

where m is the mass measurement data, P is the hydrostatic pressure measurement data, $V_1$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_2$ is a volume of the at least one item occupied inside the chamber calculated with reference to the height in-between the datum line of the at least two pressure sensors $P_{(n-1)}$ and $P_n$, $V_3$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to gravity, h is a height calculated between the at least two pressure sensors $P_{(n-1)}$ and $P_n$, wherein the at least one item comprises a distributor header, a collection header, an internal dip pipe, electrical grids, a vortex breaker, or internal pipe work supports.

5. The device as claimed in claim 4, wherein the hydrostatic pressure measurement data is hydrostatic pressure difference data $\Delta P_n$ obtained from the hydrostatic pressure measurement data of the at least two pressure sensors $P_{(n-1)}$ and $P_n$ given as: $P_{n-1}-P_n=\Delta P_n$.

6. The device as claimed in claim 4, wherein the pressure sensor $P_{(n-1)}$ is a first sensor and the pressure sensor $P_n$ is a second sensor which is positioned subsequent to the pressure sensor $P_{(n-1)}$.

7. The device as claimed in claim 1, wherein the mass of the second liquid in the emulsion condition is calculated using the formula: $(m_{ksl})=$ $$\left[\frac{(F_{ksl})(V_{b1} - V_{b2} - V_{b3})}{gh_1}\right],$$

where Fir is pressure due to the second liquid in the emulsion, where k=1,2,3, ... n, $V_{b1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{b2}$ is a volume of the at least one item occupied inside the chamber calculated with reference to the height in-between the datum line of the at least two pressure sensors $P_{(n-1)}$ and $P_n$, $V_{b3}$ is a volume occupied by the device comprising the at least two pressure sensors positioned at an equal distance within the sensor housing inside the chamber calculated with reference to the height in-between the datum line of the at least two pressure sensors $P_{(n-1)}$ and $P_n$, g is the acceleration due to the gravity, $h_1$ is the height calculated between the at least two pressure sensors $P_{(n-1)}$ and $P_n$, wherein the at least one item comprises a distributor header, a collection header, an internal dip pipe, electrical grids, a vortex breaker, or internal pipe work supports.

8. The device as claimed in claim 7, wherein $V_{b1}=A_1h_1$, where $A_1$ is the area of cross section of the chamber, $h_1$ is the height calculated between the at least two pressure sensors $P_{(n-1)}$ and $P_n$, $$V_{b2} = \left[\frac{m}{\rho}\right],$$

where m is the mass of the at least one item inside the chamber, $\rho$ is the mass density of the at least one item inside the chamber, $V_{b3}=A_3h_1$, where $A_3$ is the area of the device, $h_1$ is the height calculated between the at least two pressure sensors $P_{(n-1)}$ and $P_n$, where $V_{b1}$, $V_{b2}$, $V_{b3}$ are calculated between the at least two pressure sensors $P_{(n-1)}$ and $P_n$.

9. The device as claimed in claim 7, wherein $F_{ksl}$ is determined using the formula: $P_{sl} \times$ 'y'% of $F_{ksl}$, where $P_{sl}$ is the pressure measurement data of the second liquid between the at least two pressure sensors $P_{(n-1)}$ and $P_n$.

10. The device as claimed in claim 9, wherein 'y'% of $F_{ksl}$ is determined using the formula: 100–%'x'% of $E_{kfl}$.

11. The device as claimed in claim 1, wherein the mass of the first liquid in the emulsion condition is calculated using the formula:

$$(m_{kfl}) = \left[\frac{(E_{kfl})(V_{a1} - V_{a2} - V_{a3})}{gh_1}\right],$$

where $E_{kfl}$ is a pressure due to the first liquid in the emulsion, where k=1,2,3, ... n, $V_{a1}$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_{a2}$ is a volume of the at least one item occupied inside the chamber calculated with reference to the height in-between the datum line of the at least two pressure sensors $P_{(n-1)}$ and $P_n$, $V_{a3}$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to the gravity, $h_1$ is a height calculated between the at least two pressure sensors $P_{(n-1)}$ and $P_n$, wherein the at least one item comprises a distributor header, a collection header, an internal dip pipe, electrical grids, a vortex breaker, or internal pipe work supports.

12. The device as claimed in claim 11, wherein $V_{a1} = A_1 h_1$, where $A_1$ is an area of cross section of the chamber, $h_1$ is the height calculated between the at least two $$V_{a2} = \left[\frac{m}{\rho}\right],$$

pressure sensors $P_{(n-1)}$ and $P_n$, wherein where m is a mass of the at least one item inside the chamber, $\rho$ is mass density of the at least one item inside the chamber, wherein $V_{a3} = A_3 h_1$, where $A_3$ is an area of the device, $h_1$ is the height calculated between the at least two pressure sensors $P_{(n-1)}$ and $P_n$, where $V_{a1}$, $V_{a2}$, $V_{a3}$ are calculated between the at least two pressure sensors $P_{(n-1)}$ and $P_n$.

13. The device as claimed in claim 11, wherein $E_{kfl}$ is determined using a formula: $P_{fl} * $ 'x'% of $E_{kfl}$, where $P_{fl}$ is pressure measurement data of the first liquid between the at least two pressure sensors $P_{(n-1)}$ and $P_n$.

14. The device as claimed in claim 13, wherein 'x'% of $E_{kfl}$ is determined using a formula:

$$\frac{\Delta P_k - P_{sl}}{1\% \text{ of } P_e},$$

where $\Delta P_k$ is a hydrostatic pressure difference due to the first liquid and the second liquid in emulsion condition between the at least two pressure sensors $P_{(n-1)}$ and $P_n$, $P_{s1}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$, wherein $P_e$ value is based on the pressure measurement data of the first liquid and the second liquid.

15. The device as claimed in claim 14, 1% of $P_e$ is determined using a formula:

$$\frac{(P_{fl} - P_{sl})}{100} = \frac{P_e}{100},$$

where $P_{fl}$ is the pressure measurement data of the first liquid between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is the pressure measurement data of emulsion between the at least two pressure sensors $P_{(n-1)}$ and $P_n$.

16. The device as claimed in claim 1, wherein the device processor is further configured to calculate a height of interface layers in the emulsion condition of the first liquid and the second liquid.

17. The device as claimed in claim 16, wherein the interface layers comprise a first liquid-emulsion interface layer from the bottom of the chamber and a second liquid-emulsion interface layer from the bottom of the chamber.

18. The device as claimed in claim 17, wherein a height of the first liquid-emulsion interface layer is determined by the formula: $h_{fle} = (h_{p(n-1)} + H)$, where $h_{fle}$ is a height of the first liquid-emulsion interface layer from the bottom of the chamber, $h_{p(n-1)}$ is a height from the bottom of the chamber corresponding to the pressure sensor $P_{(n-1)}$ obtained from a look up table corresponding to a chamber strapping table, H is the height of interface layer between the at least two pressure sensors $P_{(n-1)}$ and $P_n$.

19. The device as claimed in claim 18, wherein the height 'H' of interface layer between the at least two pressure sensors $P_{(n-1)}$ and $P_n$ is determined by the formula: H='x'% of $E_{kfl} * $'$h_1$', where $E_{kfl}$ is pressure due to the first liquid in emulsion calculated between the at least two pressure sensors $P_{(n-1)}$ and $P_n$, $h_1$ is the height between the at least two pressure sensors $P_{(n-1)}$ and $P_n$.

20. The device as claimed in claim 19, wherein 'x'% of $E_{kfl}$ is determined by $$\frac{\Delta P_k - P_{sl}}{1\% \text{ of } P_e},$$

where $\Delta P_k$ is pressure difference between the at least two pressure sensors $P_{(n-1)}$ and $P_n$, $P_{sl}$ is pressure measurement data of the second liquid between the at least two pressure sensors $P_{(n-1)}$ and $P_n$, $P_e$ is pressure measurement data of emulsion between the at least two pressure sensors $P_{(n-1)}$ and $P_n$, wherein $P_e$ value is based on the pressure measurement data of the first liquid and the second liquid.

21. The device as claimed in claim 20, wherein 'x'% of $E_{kfl}$ is a largest value selected among the calculated 'x'% of $E_{kfl}$, where k=1,2,3, ... n, wherein x % of $E_{kfl}$ is less than 100% of $P_{fl}$ and greater than 100% of $P_{sl}$, wherein $P_{fl}$ is pressure measurement data of the first liquid between the at least two pressure sensors $P_{(n-1)}$ and $P_n$, wherein $P_{sl}$ is pressure measurement data of the second liquid between the at least two pressure sensors $P_{(n-1)}$ and $P_n$.

22. The device as claimed in claim 17, wherein a height of the second liquid-emulsion interface layer from the bottom of the chamber is determined using the formula: $h_{sle}=(h_{p(n-1)}+H)$, where $h_{sle}$ is a height of the second liquid-emulsion interface layer height from the bottom of the chamber, $h_{p(n-1)}$ is a height from the bottom of the chamber corresponding to the pressure sensor $P_{(n-1)}$ obtained from a look up table corresponding to a chamber strapping table, H is a height of interface layer between the at least two pressure sensors $P_{(n-1)}$ and $P_n$.

23. The device as claimed in claim 22, wherein the height 'H' of interface layer between the at least two pressure sensors $P_{(n-1)}$ and $P_n$ is determined using the formula: H='x'% of $E_{kfl}$*'$h_1$', where $E_{kfl}$ is the pressure due to the first liquid in the emulsion calculated between the at least two pressure sensors $P_{(n-1)}$ and $P_n$, $h_1$ is the height between the at least two pressure sensors $P_{(n-1)}$ and $P_n$.

24. The device as claimed in claim 23, wherein 'x'% of $E_{kfl}$ is calculated by $$\frac{\Delta P_k - P_{sl}}{1\% \text{ of } Pe},$$

where $\Delta P_k$ is pressure difference between the at least two pressure sensors $P_{(n-1)}$ and $P_n$, $P_{sl}$ is pressure measurement data of the second liquid between the at least two pressure sensors $P_{(n-1)}$ and $P_n$ and $P_e$ is pressure measurement data of emulsion between the at least two pressure sensors $P_{(n-1)}$ and $P_n$, wherein $P_e$ value is based on the pressure measurement data of the first liquid and the second liquid.

25. The device as claimed in claim 24, wherein 'x'% of $E_{kfl}$ is a smallest value selected among the calculated 'x'% of $E_{kfl}$ where k=1,2,3, . . . n, wherein x % of $E_{kfl}$ is less than 100% of $P_{fl}$ and greater than 100% of $P_{sl}$, wherein $P_{fl}$ is pressure measurement data of the first liquid between the at least two pressure sensors $P_{(n-1)}$ and $P_n$ and $P_{sl}$ is pressure measurement data of the second liquid between the at least two pressure sensors $P_{(n-1)}$ and $P_n$.

26. A method for measuring and quantifying mass contents of two liquids that are immiscible in an emulsion state, the method comprising:
  obtaining at least two pressure measurement data by at least two pressure sensors directly in contact with the fluid comprising three different layers 'X', 'Y' and 'Z' contained in a chamber;
  converting the hydrostatic pressure measurement data into respective mass measurement data using a mass calculation formula;
  detecting a condition of the fluid as emulsion, if the hydrostatic pressure measurement data is lesser than the hydrostatic pressure measurement data of a first liquid in the fluid and greater than the hydrostatic pressure measurement data of a second liquid in the fluid;
  calculating the first liquid mass and the second liquid mass in the emulsion condition of the first liquid and the second liquid; and
  calculating a total mass of the first liquid and total mass of the second liquid in the chamber.

27. The method as claimed in claim 26, wherein the mass calculation formula is defined as:

$$m = \left[\frac{(P)(V_1 - V_2 - V_3)}{gh}\right],$$

where m is the mass measurement data, P is the hydrostatic pressure measurement data, $V_1$ is an inside volume of the chamber comprising (i) the device comprising the at least two pressure sensors within a sensor housing, and (ii) at least one item calculated with reference to a height in-between a datum line of the at least two pressure sensors $P_{(n-1)}$ and $P_n$, $V_2$ is a volume of the at least one item occupied inside the chamber calculated with reference to the height in-between the datum line of the at least two pressure sensors $P_{(n-1)}$ and $P_n$, $V_3$ is a volume occupied by the device comprising the at least two pressure sensors within the sensor housing inside the chamber calculated with reference to the height in-between the datum line of the at least two pressure sensors $P_{(n-1)}$ and $P_n$, g is an acceleration due to gravity, h is a height calculated between the at least two pressure sensors $P_{(n-1)}$ and $P_n$, wherein the at least one item comprises a distributor header, a collection header, an internal dip pipe, electrical grids, a vortex breaker, or internal pipe work supports.

28. The method as claimed in claim 27, wherein the hydrostatic pressure measurement data is hydrostatic pressure difference data $\Delta P_n$ obtained from the hydrostatic pressure measurement data of the at least two pressure sensors $P_{(n-1)}$ and $P_n$ given as: $P_{n-1}-P_n=\Delta P_n$.

* * * * *